United States Patent [19]

Ferrarini, Jr. et al.

[11] 4,232,133
[45] Nov. 4, 1980

[54] POLYISOCYANURATE CONTAINING MOLDING COMPOSITIONS

[75] Inventors: L. James Ferrarini, Jr., West Chester, Pa.; Joseph Feltzin, Wilmington, Del.

[73] Assignee: ICI Americas Inc., Wilmington, Del.

[21] Appl. No.: 928,690

[22] Filed: Jul. 27, 1978

[51] Int. Cl.³ .............................................. C08L 75/04
[52] U.S. Cl. ..................................... 525/452; 525/455
[58] Field of Search ...................... 260/859 R; 528/75; 525/452

[56] References Cited

U.S. PATENT DOCUMENTS

| | | | |
|---|---|---|---|
| 2,952,665 | 9/1960 | Bunge | 528/75 |
| 3,577,391 | 5/1971 | Argabright | 528/75 |
| 3,891,523 | 6/1975 | Hisamatsu | 260/859 R |
| 4,034,017 | 7/1977 | Chang | 528/75 |
| 4,073,828 | 2/1978 | Ferrarini | 260/859 R |

Primary Examiner—Paul R. Michl
Attorney, Agent, or Firm—Roger R. Horton; Jay W. Sanner; Richard A. Rowe

[57] ABSTRACT

Ethylenically unsaturated monomer solutions containing ethylenically unsaturated polyisocyanurate resins are thickened to moldable non-sticky gels by the formation in said solution of minor amounts of cross-linked polyurethane resin mixtures. These are made by the addition of polyisocyanates and certain low molecular weight polyols and urethane formation catalysts. When these moldable gels are fully cured, their physical properties are nearly equal to those cast from the ungelled polyisocyanurate monomer copolymer.

22 Claims, No Drawings

POLYISOCYANURATE CONTAINING MOLDING COMPOSITIONS

BACKGROUND OF THE INVENTION

This invention is directed to non-sticky gels of ethylenically unsaturated monomer solutions containing isocyanurate resins and which are particularly useful as sheet molding compounds. Of particular interest are polyvinylisocyanurate resin polyol blends which can be molded into intricately shaped articles having a high loading of glass fibers and which can be copolymerized with the ethylenically unsaturated monomer at relatively moderate temperatures. In particular it is directed to gelled vinylidene monomer solutions of ethylenically unsaturated polyisocyanurate resins by employing mixed polyurethane/polyisocyanurate resins free of ethylenic unsaturation as the gelling or thickening agent. It is also directed to a process for forming gelled solutions wherein a relatively large molar excess of aromatic polyisocyanate is added to a monomer solution of polyisocyanurate resin containing certain primary and secondary polyol reactants. Furthermore, it is directed to thickened ethylenically unsaturated copolymer resin solutions which can be molded and cured at moderate temperatures and pressures to form completely cured polyvinyl isocyanurate resins of low profile or deep drawn reinforced components having a filler content as high as 80%. The fully cured gelled composition retains substantially all the physical properties that would be obtained from a cast vinylisocyanurate/vinyl monomer copolymer containing no polyurethane thickener. Such fully cured vinyl isocyanurate thermoset resin exhibit especially superior tensile and flexural strength at high temperatures.

Molding compositions employing ethylenically unsaturated polyester resins having unreacted carboxyl groups and vinylidene monomers have been thickened by the addition of inorganic materials such as calcium or magnesium oxides. Gellation takes place rather slowly with the employment of these oxides and in some instances require as many as two or three days to obtain a handleable or non-sticky condition. If not molded within a short period of time thereafter, they must be discarded since the gellation and cross-linking continues to a point where the composition is no longer tractable.

More recently, however, cross-linked polyurethane thickened gels of polyester resins have been developed which are an improvement over the metal oxide thickened materials in that they have increased stability and can be maturated to form moldable compositions within a few hours. Such systems after complete curing exhibit improved shrinkage characteristics over the cured metal oxide cross-linked and thickened materials. Both linear and cross-linked polyurethane copolymers have been used for ethylenically unsaturated polyester resins and are described in U.S. Pat. Nos. 3,047,530; 3,290,208; 3,464,935; 3,644,569; 3,700,752; 3,859,381; 3,868,431; 3,886,229; 3,893,956; 3,962,370; 3,994,764; 3,997,490; 4,062,826; and 4,073,828. In many ways, the systems described for the thickening of ethylenically unsaturated polyester resins/monomer solutions are similar to that of the invention. However, when isocyanurate resins are substituted for polyester resins in the ethylenically unsaturated polymer-in-monomer solutions, incompatability and incomplete maturation problems lead to the formation of cottage cheese or sticky jelly-like gels which can neither be shaped, handled or used to form uniformly filled molded objects.

In recent years the automobile industry has been striving to reduce weight of most newly manufactured vehicles as a means for increasing gas mileage. A most attractive way to reduce weight is to switch from metal to light-weight plastic components. However, plastics are inherently weak and must be highly reinforced to meet tensile strength requirements of certain components such as wheels, brackets and structural panels. In order to meet this strength requirement, resins must be reinforced with materials such as glass fiber filaments in high concentrations, mostly exceeding 50% by weight. Compositions having large amounts of filler, while producing very strong completely cured resins are difficult to mold into articles having uniformly distributed reinforcing materials. In producing molded articles having intricate shapes wherein a preform containing fibrous filler is squeezed between the male/female sections of the mold and the flowout exceeds 30%, it is difficult to obtain a uniformly filled article. Usually resin material flows away from the fibrous filler leaving the article more highly filled in the region of the preform and scantily filled at the mold extremities or locations of maximum flowout.

In extruding and molding conventional ethylenically unsaturated polyester resins, a high concentration of fiberglass reinforcing agent is required to produce a molded article having suitable strength. However, as the concentration of fiberglass is increased, the amount of thickening agent such as a conventional cross-linked polyurethane must also be increased. When the concentration of urethane is increased, the amount of available polyester resin is decreased, thereby diluting the high strength and flexibility characteristics of the fully cured base resin. With the combination set forth in the present invention, physical properties, such as flex strength and heat distortion temperature, are not adversely affected by the use of larger amounts of thickening agent as demonstrated by the examples. It is now possible to make thickened polyisocyanurate glass reinforced articles of complex shape having better uniformity and strength throughout.

It has now been found that ethylenically unsaturated polyisocyanurates, such as poly(1,3,5-tri-R substituted S triazine-2,4,6trione) may be thickened and copolymerized with unsaturated monomer R groups containing ethylenic unsaturated materials. R groups may also be linked with epoxy, polyurethane and polyester resins. Such isocyanurates are well-known as represented by U.S. Pat. Nos. 2,952,665; 3,041,313; 2,821,098; 3,850,770; 3,719,638; 3,437,500; 3,947,736 and 3,762,269. Of particular interest are polyvinyl isocyanurates described in copending U.S. Application Ser. Nos. 819,352 and 819,353 to Markiewitz et al. and which are also assigned to ICI Americas Inc. For the purposes of this invention, polyisocyanurate resins can be considered as cross-linked networks of isocyanurate rings having ethylenically substituted aromatic pendant groups. Aromatic rings may be linked to ethylenically unsaturated moieties through carbamyl, urylene, ether, carbonyl, carboxyl and combinations thereof. In most instances satisfactory resins are prepared by reacting a polyisocyanate with a hydroxyl-terminated ethylenically unsaturated compound such as ethylenically unsaturated monohydroxy alcohols, monohydroxy ethylenically unsaturated esters, monoamino ethylenically unsaturated esters, monohydroxy ethylenically unsaturated ureas, ethylenically unsaturated monoamines, ethylenically unsaturated hydroxylamines and polyalkoxylated vinyl alcohols to name a few. Monohydroxy compounds are reacted under conditions which favor the reactivity with only one isocyanate per molecule of the polyisocyanate aromatic compound. It is well understood, however, that a substantial quantity of polyisocyanate molecules go completely unreacted while others go completely reacted to form polyurethanes.

It has now been found that improved blends are useful in preparing non-sticky molding compositions by the reaction therewith of polyisocyanates comprising:

5–95% by weight of a polyethylenically unsaturated polyisocyanurate resin,

5–95% by weight of an ethylenically unsaturated monomer, and 1.5–30% by weight of relatively non-polar polyol free of ethylenic unsaturation having a molecular weight in the range of 300–2,000 selected from the group consisting of polyether glycols of ethylene glycol, polyhexamethylene glycol, aromatic ethers which are condensation products of propylene oxide, and dihydroxy terminated polyesters derived from glycols, polyether glycols and dicarboxylic acids.

These blends are converted to tack-free molding compositions by the addition of polyisocyanate such that the mol ratio of the hydroxyl groups in the blend to the isocyanate groups in the added polyisocyanate ranges from 0.66–0.95.

Of particular interest are isocyanurates of urethanes of an aromatic polyisocyanate and at least one vinylidene carbonyl oxy alkanol characterized by one of the following formulae:

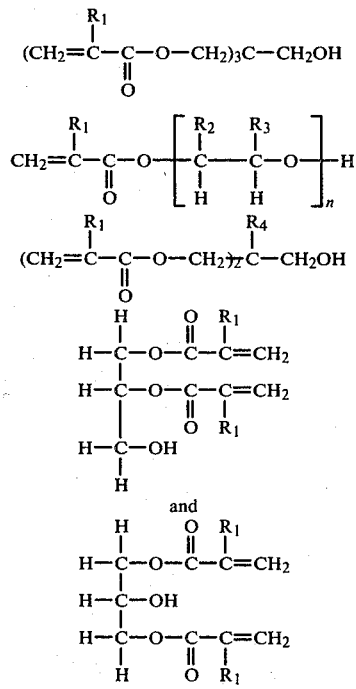

wherein $R_1$ is hydrogen or an alkyl group containing from 1 to 4 carbon atoms, $R_2$ is hydrogen, alkyl containing from 1 to 12 carbon atoms, or a chlorinated, brominated, or fluorinated alkyl group containing from 1 to 12 carbon atoms, $R_3$ is hydrogen, alkyl containing from 1 to 12 carbon atoms, or a chlorinated, brominated, or fluorinated alkyl group containing from 1 to 12 carbon atoms, $R_4$ is hydrogen, methyl or ethyl, and n is from one to four, with the proviso that $R_2$ and $R_3$ on adjacent carbon atoms are not both alkyl or chlorinated, brominated, or fluorinated alkyl, that is at least one of $R_2$ and $R_3$ must be hydrogen. In order to obtain resins having the excellent combination of high temperature physical properties provided by the present invention, it is essential that the resin be prepared from an unsaturated isocyanurate composition wherein at least a major amount of the isocyanurate moieties are based on one or more vinylidene carbonyl oxy alkanols defined above. Illustrative examples of such alkanols include; hydroxypropyl methacrylate, hydroxyethyl methacrylate, hydroxypropyl acrylate, hydroxyethyl acrylate, pentaerythritol triacrylate, pentaerythritol trimethacrylate, and diacrylates and dimethacrylates of trimethylol propane, trimethylol ethane, trimethylol methane, and glycerol. A preferred group of vinylidene carbonyl oxy alkanols include hydroxypropyl methacrylate, hydroxyethyl methacrylate, hydroxypropyl acrylate, hydroxyethyl acrylate, and blends thereof. Another preferred group of such alkanols are blends of polyfunctional acrylates or methacrylates such as pentaerythritol triacrylate, pentaerythritol trimethacrylate, and mixtures thereof, with one or more monofunctional acrylates or methacrylates such as hydroxypropyl acrylate, hydroxypropyl methacrylate, hydroxyethyl acrylate, and hydroxyethyl methacrylate.

While the isocyanurates of this invention must contain moieties derived from one of the vinylidene carbonyl oxy alkanols defined above, the moieties derived from an aromatic polyisocyanate may be based on any trimerizable aromatic polyisocyanate. In fact, any trimerizable aromatic polyisocyanate which is conventionally used in the art for the preparation of isocyanurates may be used to prepare the isocyanurate compositions of the present invention. For example, the aromatic polyisocyanate may or may not contain ethylenic unsaturation and it may be monomeric or polymeric. The only requirements are that the aromatic polyisocyanate contain at least two aromatic isocyanate groups, be trimerizable, and be free of any groups which interfere with the trimerization of isocyanate groups or which interfere in the reaction of an isocyanate group with a hydroxyl group. Illustrative examples of aromatic polyisocyanates which are particularly useful in the preparation of isocyanurate compositions of this invention include: 2,4-tolylene diisocyanate; 2,6-tolylene diisocyanate; m-phenylene diisocyanate; p-phenylene diisocyanate; 1,5-naphthalene diisocyanate; 4,4'-diphenyl ether diisocyanate; 4,4',4''-triphenylmethane triisocyanate; 2,4,4'-triisocyanatodiphenylmethane; 2,2',4-triisocyanato diphenyl; 4,4-diphenylmethane diisocyanate; 4,4'-benzophenone diisocyanate; 2,2-bis(4-isocyanatophenyl)propane; 1,4-naphthalene diisocyanate; 4-methoxy-1,3-phenylene diisocyanate; 4-chloro-1,3-phenylenediisocyanate; 4-bromo-1,3-phenylene diisocyanate; 4-ethoxy-1,3-phenylene diisocyanate; 2,4'-diisocyanatodiphenyl ether; 4,4'-diisocyanatodiphenyl; 9,10-anthracene diisocyanate; 4,6-dimethyl-1,3-phenylene diisocyanate; 4,4'-diisocyanatodibenzyl; 3,3'-dimethyl-4,4'-diisocyanatodiphenylmethane; 3,3'-dimethyl-4,4'-diisocyanatodiphenyl; 3,3'-dimethoxy-4,4'-diisocyanatodiphenyl; 1,8-naphthalene diisocyanate; 2,4,6-tolyiene triisocyanate; 2,4,4'- triisocyanatodiphenyl ether, diphenylmethane diisocyanate, polymethylene polyphenylene polyisocyanate available under the trademarks Rubinate M and Papi, having a functionality of 2.1 to 2.7; 1,3-xylene 4,6-diisocyanate; aromatic isocyanate terminated polyurethanes; and aromatic isocyanate terminated pre-polymers of polyesters. Although it is preferred to use all aromatic polyisocyanate, small amounts of an aliphatic polyisocyanate, for example, 1,6-hexamethylene diisocyanate, isophorone diisocyanate, or alpha,alpha'-diisocyanato-p-xylene, may be used in combination with the aromatic polyisocyanate.

The unsaturated isocyanurate resins can be envisioned as chains and three dimensional networks of isocyanurate rings having urethane linked aromatic vinylidene side chains. Because of the nature of the reactants involved and the catalyst used, not all the isocyanate groups undergo reaction to form isocyanurate and urethane linkages but in fact, a substantial quantity of allophanate and uretidine dione structures maybe formed. In most instances, the polyisocyanurate resins are substantially free of unreacted isocyanate groups. The polyisocyanurate resin normally contains less than about 400 isocyanurate rings or their equivalent per molecule and vary in molecular weight from 2,000 to 200,000. Prior to curing, the solid isocyanurates are fusable and exhibit a softening point as determined by the ring and ball method described in ASTM designation E 28-58T.

Isocyanurate resins may be prepared by reacting an aromatic polyisocyanate with one or more of the described vinylidene hydroxy compounds to form an isocyanate-containing urethane to form the ethylenically unsaturated isocyanurate resin. The —NCO/OH mol ratio in the reaction mix is maintained at a range at from 0.75 to 1.6 and preferably from about 0.9 to about 1.4. When the reaction is carried out in equal parts of an inert-solvent and the reactants are hydroxypropyl methacrylate and toluene diisocyanate, the preferred mol ratio for sheet molding applications range from 0.95 to about 1.05.

In carrying out the trimerization reaction, the temperature must be maintained such that the vinylidene group does not undergo the additional polymerization prematurely. Usually the reaction is carried out in a range of 0° to about 95° C.

Up to about 49 mol percent of the vinylidene carbonyl oxy alkanol described in the list above may be replaced with a monohydric alcohol selected from methanol, ethanol, propanol, butanol, isobutanol, octyl alcohol, cyclohexanol, benzyl alcohol, allyl alcohol, glycerol diallyl ether, trimethylolpropane diallyl ether, saturated halogenated alcohols, halogenated alcohols containing ethylenic unsaturation, for example, dibromoneopentyl glycol monoacrylate and monomethacrylate, halogenated allyl alcohols, monohydric alcohols such as 2-bromo ethanol, 3-bromo-1-propanol, 4-chloro-1-butanol, 2-chlorethanol, 4-chloro-1-hexanol, 3-chloro-1-propanol, 2,3-dibromo-1-propanol, 2,3-dichloro-1-propanol, 2,2,2-trichloroethanol, 1-bromo-2-propanol, 1-chloro-2-propanol, 1,3-dibromo-2-propanol, and 1,3-dichloro-2-propanol, mono acrylate and mono methacrylate esters of alkoxylated bisphenol A and alkoxylated tetra bromobisphenol A, and polyoxyethylene and polyoxypropylene ether of monohydric phenols.

Illustrative examples of dihydric alcohols which may be used to replace up to 33 mol percent, and preferably up to 10 mol percent, of the vinylidene carbonyl oxy alkanols described include: ethylene glycol, propylene glycol, polyethylene glycol, polypropylene glycol, compounds characterized by the formula:

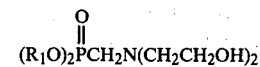

wherein $R_1$ is an alkyl group containing from 1 to 4 carbon atoms, 1,4-butane diol, pentamethylene glycol, hexamethylene glycol, glycerol methyl ether, polyoxyethylene and polyoxypropylene ethers of dihydric phenols such as bisphenol A, glycerol monochlorohydrin, glyceryl monostearate, dihydroxy acetone, and monoesters of the above polyols and acrylic acid or methacrylic acid.

The unsaturated isocyanurate compositions of this invention may be homopolymerized or copolymerized with one or more other ethylenically unsaturated copolymerizable compounds. Where the unsaturated isocyanurate composition of this invention is to be copolymerized with monomer, the isocyanurate composition may be dissolved in the copolymerizable monomer or it may be desirable to utilize the copolymerizable compound as a solvent for the reaction system in which the ethylenically unsaturated isocyanurate compositions of this invention are formed. If the ethylenically unsaturated copolymerizable monomer is to be used as a solvent for the preparation of the unsaturated isocyanurate products, the solvent should not contain any groups which would react with isocyanate groups or in any way interfere with the urethane formation reactions or trimerization reactions which occur in the formation of the isocyanurate products of this invention. Thus, the solvent should not contain any hydroxyl, carboxyl, or amine groups which might interfere with these reactions. This limits the suitable solvents to esters, ethers, hydrocarbons and similar solvents containing non-reactive groups. Illustrative examples of solvents which may be employed in the preparation of the isocyanurate products of this invention include: divinyl benzene, styrene, meythl acrylate, methyl methacrylate, ethyl acrylate, ethyl methacrylate, 2-ethylhexyl acrylate, 2-ethylhexyl methacrylate, butyl acrylate, butyl methacrylate, cyclohexyl acrylate, cyclohexyl methacrylate, chlorostyrene, acrylonitrile, vinylidene chloride, vinyl acetate, vinyl stearate, vinyltolylene, hexandiol diacrylate, hexanediol dimethacrylate, tetrahydrofurfuryl methacrylate, diethylene glycol diacrylate, triethylene glycol diacrylate, allyl methacrylate, diallyl fumarate, tetramethylene glycol diacrylate, trimethylolpropane triacrylate, neopentyl glycol diacrylate, 1,3-butylene glycol diacrylate, 1,3-butylene glycol diacrylate, 1,3-butylene glycol dimethacrylate, polyethylene glycol diacrylate, dimethylstyrene, ethylstyrene, propylstyrene, para-chloromethyl styrene, meta-dibromoethyl styrene, bromo styrene, dichloro styrene, t-butyl styrene, vinyl propionate, and vinyl butyrate. Nonpolymerizable solvents may also be used, for example, benzene, toluene, xylene, and ethylbenzene. The solvent may be removed from the reaction mixture after the formation of the isocyanurate to give a solid product. The solid product may be dissolved in the same or a different polymerizable solvent prior to curing. Mixtures of solvents may also be used. Preferred solvents are styrene, a mixture of styrene and methyl methacrylate, and a mixture of styrene and divinylbenzene.

When the isocyanurates are prepared in the absence of solvent, the product formed is a solid and requires special processing which permits the easy removal of the heat generated by the reaction and which prevents the reaction mixture from reaching high temperatures which may induce insolubility and gelation of the products. Among these special processing techniques may be the trimerization of the monourethane in thin layers on moving temperature-controlled belts or in temperature controlled trays.

The amount of solvent employed to dissolve the isocyanurate compositions of this invention may vary over a very wide range. The particular amount of solvent used will depend somewhat on the nature of the solvent and on the solubility of the particular isocyanurate used. The polymeric character of the isocyanurate product allows maintenance of adequate working viscosity at relatively low concentrations of dissolved solids. Products of this invention may be made which permit adequate laminate working viscosity, which is defined as 100 to 10,000 centipoises Brookfield as determined on a Brookfield Viscometer, Model LVT, #2 spindle, at 30 rpm., at 25° C. The amount of solvent will also depend on the nature of the properties desired in the final cured product. Thus, if one is interested in preparing a copolymer of styrene and an isocyanurate of a monourethane of tolylene diisocyanate and hydroxypropyl methacrylate, for example, the high temperature properties of the final product will increase as the concentration of the styrene decreases. In general, however, the amount of solvent used will be from 5 to 95 weight percent of the total composition and preferably from 30% to 80% by weight of the total composition. A particularly preferred concentration is about 50% by weight.

Suitable catalyst for carrying out the urethane formation of step 1 of the above process in addition to copper salt, are: organo-metallic compounds of tin, zinc, lead, mercury, cadmium, bismuth, cobalt, manganese, antimony, iron and the like such as, for example, metal salts of carboxylic acids having from about 2 to about 20 carbon atoms including for example stannous octoate, dibutyl tin dilaurate, dibutyl tin diacetate, ferric acetyl acetonate, lead octoate, lead oleate, cobalt naphthanate, lead naphthanate, mixtures thereof and the like. It is preferred that the catalysts be employed in liquid form. Those catalysts which are not ordinarily liquids may be added as a solution in solvent. It is best to carry out the urethane reaction in the absence of a trimerization catalyst in order to reduce premature thickening.

The trimerization of isocyanates is usually carried out in the presence of such catalysts as tertiary amines, organic quarternary ammonium hydroxide compounds, diones, metallic salts of carboxylic acids, alkoxides or phenoxides of alkali or alkaline earth metals, organic phosphines, organo-metallic compounds of tin, animony and the like. The catalyst concentration in the reaction may range from 0.01-3.0% based on the total weight of the resin.

A typical polyvinylisocyanurate resin can be prepared by the following technique:

EXAMPLE A

Into a chemical reactor equipped with agitator, condenser, gas pipe connections, vents, and port holes which is first flushed with nitrogen and thereafter sparged with 2 cfm. air and 6 cfm. nitrogen is added 2,680 parts of hydroxypropyl methacrylate and agitated at 30 revolutions per minute. Thereafter, 2.5 parts copper acetate catalyst, 12 parts of a 20% solution of t-butyl catechol and 5,743 parts styrene is charged to the reactor. The contents of the reactor are adjusted to 42°±2° C. and thereafter sparged with 3-4 cfm. nitrogen. Under increased agitation, 50-60 revolutions per minute, 3,063 parts of toluene diisocyanate is added at a rate of 60-70 parts per minute in four 766 part portions. After the first 766 part portion is added, the temperature is permitted to rise to 65° C. After the second portion, the temperature is permitted to rise to 78° C. After the third portion, the temperature is permitted to rise to 90° C. and after the fourth portion, the temperature is permitted to go no higher than 93° C. The reaction mix is permitted to stir for one additional hour at 90° C. at which time the unreacted isocyanate content should be less than 4.5%. The reaction mix is cooled to 55° C. and then mixed with 18 parts N-benzyl trimethyl ammonium hydroxide as a 40% methanol solution.

The exothermic trimerization reaction takes place and with additional cooling, the reaction mixture should not be permitted to go above 60° C. The reaction is permitted to continue until the unreacted isocyanate content in ranges between 0.05-0.15% and the viscosity ranges between 425-475 cps. At this point, 6 parts of methanesulphonic acid is added to inhibit the activity of the trimerization catalyst. The styrene/polyisocyanurate resin solution is stored for later use under conditions which inhibit further polymerization.

The reaction product has a number average molecular weight of about 1160, a weight average molecular weight of about 2000, and a polydispersity of about 1.9. About 95% of the isocyanurates present have a molecular weight of below about 5200 and contain some isocyanurates having a molecular weight about 5200 and below about 26,000. This product corresponds to a resin where the number of isocyanurate rings in most of the isocyanurate molecules is less than 10. This product has a ball and ring melting point of about 95° C. and a viscosity (1) of about 400-600 cps at 25° C., and a refractive index of about 1.557 $ND^{20}$. The infra-red spectrum of this product shows absorption bands characteristic of isocyanurates and the essential absence of isocyanate functionality. The hydroxyl number of the product is essentially zero.

(1) 50% styrene solution.

EXAMPLE B

This example illustrates the preparation of an allophanate-free resin from a resin containing a large amount of allophanate.

A small reaction vessel is charged with 100 g. of a resin prepared according to Example A, which by NMR analysis had an allophanate to urethane ratio of 0.45. 0.4 ml of Triton B (40% solution of benzyltrimethylammonium hydroxide in methanol) is added and 0.5 ml of a 10% solution of equal amounts of t-butylcatechol and the monomethyl ether of hydroquinone. The resulting mixture is heated for 1½ hours at 95° C. The final product is free of all detectable allophanate linkages upon NMR analysis.

Tractable shaped articles capable of being further shaped having from 5-95% by weight ethylenically unsaturated polyisocyanurate resin having 1-3 vinylidene groups per isocyanurate ring or its equivalent in a solution with at least one ethylenically unsaturated monomer which will react with ethylenically unsaturated groups in the isocyanurate resin can be made by thickening a homogenous mixture of the polyisocyanurate resin/ethylenically unsaturated monomer solution with polyurethane made in solution therewith by reacting an aromatic polyisocyanate having 2–5 isocyanate groups per mol with a polyol having a molecular weight of about 300–2,000 and wherein the mol ratio of the total hydroxyl groups to isocyanate groups in the reaction mix is held between 0.66 and 0.95.

In the practice of the invention to form a fully cured article from the tractable handleable, moldable composition of the invention, essentially three steps are taken:

Step 1—Form an ethylencially unsaturated monomer solution having dissolved therein 5–95% by weight of an ethylenically unsaturated polyisocyanurate resin; and 1.5–30% by weight of a polyol having a mol weight of 300–2,000.

Step 2—Gel of thicken the monomer solution by intermixing it with a polyisocyanate and catalyst with sufficient agitation to form a homogeneous mixture and thereafter permit gellation to form a handleable, non-sticky, tractable molding composition;

Step 3—Inject the gelled tractable material into a mold and initiate the copolymerization of the ethylenically unsaturated monomers and resins.

The following ethylenically unsaturated monomers may be used: styrene, vinyl toluene, divinyl benzene, acrylic acid esters and methacrylic acid esters, such as methylacrylate, ethylacrylate, n-butylacrylate, 2-ethylhexylacrylate, methylmethacrylate, pentaerythritol thiacrylate, ethyleneglycol dimethacrylate, diallyl maleate, diallyl fumarate, triallylcyanurate, vinyl acetate, vinyl proprionate, vinyl ether, acrylonitrile, and the like. In general, by ethylenically unsaturated monomer is meant a relatively low molecular weight compound having at least one ethylenically unsaturated group which will react with itself or with ethylenic unsaturation within the isocyanurate resin by free-radical activation.

The polyvinyl isocyanurate resin/ethylenically unsaturated monomer solution is thickened by the addition of polyurethane forming ingredients selected from certain polyols and polyisocyanates. In practice of the invention, normally the polyol is mixed with the polyisocyanurate resin/monomer solution along with various additives such as fillers, coloring agent, reinforcing agents, release agents, catalysts, accelerators and stabilizers. To this homogenous mixture is added an appropriate amount of polyisocyanate and heat, if needed to form a thickened tractable molding composition which can be further shaped and used for injection molding processes to form a fully-cured article having superior strength and uniformity of composition.

The polyols and polyisocyanates employed in the practice of this invention should be free of ethylenic unsaturation. That is, the polyurethane should be free of ethylenic unsaturation which will undergo polymerization with the ethylenic unsaturation in the isocyanurate and monomer ingredients.

The polyols may be selected particularly from the polyethers and polyesters having terminal hydroxyl groups and having molecular weights ranging from about 300–2,000. Of particular interest are polyols of polyethylene glycol, polyisopropylene glycol, polytetramethylene glycol, and polyhexamethylene glycol having molecular weights in the range of 650–1,000. Polyol ethers of bisphenol A which are condensation products of propylene oxide with bisphenol A having molecular weights in the range of 350–750 are most effective. Dihydroxy terminated polyesters derived from glycols and polyether glycols having molecular weights of up to 2,000 are also useful in preparing polyurethane thickened polyisocyanurate resins. Such polyesters are derived from ethylene glycol, propylene glycol, diethylene glycol, hexamethylene glycol, tetramethylene glycol and their polyether condensation products. These saturated glycols are condensed with dicarboxylic acids which are free of ethylenic unsaturation, such as adipic, sebacic, glutaric, pimelic, isophthalic, phthalic and terephthalic acids or their corresponding anhydrides. Particularly useful are polyesters of poly(ethyleneglycol adipate) having molecular weights of 500 and 1,000; poly(diethyleneglycol adipate) having molecular weights of 500, 1,000 and 2,000 and poly (hexamethyleneglycol adipate) having molecular weights of 1,000. Suitable other polyesters may be selected from poly(ethyleneglycol sebacate), poly(ethyleneglycol glutarate), poly(ethyleneglycol pimelate, poly(propyleneglycol sebacate), poly(propyleneglycol glutarate); poly(propyleneglycol pimelate), and poly(ethyleneglycol terephthalate) or poly(propyleneglycol isophthalate).

Oxypropylated derivatives of aromatic diols, such as bisphenol A which are condensation products of 1 mol of diol with from 2–15 mols of propylene oxide are useful as both polyether glycol in the formation of polyurethane or in the formation of a dihydroxy-terminated polyester derivatives.

The polyisocyanates used in the formation of the polyurethane thickener may be bi-functional or tri-functional or even higher functionality. The polyisocyanate may be aliphatic, cycloaliphatic or aromatic or may contain, in the same polyisocyanate molecule, aliphatic and aromatic isocyanate groups, aliphatic and cyclo-aliphatic and aromatic isocyanate groups, aliphatic and cycloaliphatic isocyanate groups, cyclo-aliphatic and aromatic isocyanate groups, cyclo-aliphatic and aromatic isocyanate groups, or even aliphatic cyclo-aliphatic and aromatic isocyanate groups. The desired mixtures of two or more different polyisocyanates may be employed.

Examples of suitable polyisocyanates include 4,4'-diphenylmethane diisocyanate, 2,4- and 2,6-toluene diisocyanate and mixtures thereof, isophorone diisocyanate, tetramethylene diisocyanate, pentamethylene diisocyanate, hexamethylene diisocyanate and 4,4'-dicyclohexylmethanediisocyanate. Particularly useful is polymethylene polyphenyl isocyanate which comprises a mixture having 2–6 isocyanate groups per molecule and which has a funtionality averaging between 2.1 and 3 isocyanate groups per mol and most often 2.3–2.7 isocyanate groups per mol and is sometimes referred to in the art as MDI.

For best results, a homogeneous mixture containing a vinylidene monomer solution of the ethylenically unsaturated isocyanurate resin and the polyol is prepared by mixing them at room temperature, although elevated temperatures may be employed, if necessary. Into this polyol/resin/vinyl monomer solution are dissolved catalysts such as a polyurethane catalyst, a trimerization catalyst and a free-radical initiator catalyst and optional reinforcing materials, fillers, accelerators, stabilizers, antioxidants, mold-release agents, etc. Into this homogeneous solution is added the polyisocyanate in such a manner as to result in a homogeneous mixture of the reactants, fillers and catalysts. Reaction takes place in such a manner that the temperature is kept below the activation point of the free-radical initiator catalyst. Depending upon the concentration of the reactive ingredients, the effectiveness of the catalyst and the temperature, the solution may be gelled within a period as short as one minute and as long as twenty-four hours. In the most rapid gelling system, the filler should be added well in advance of the addition of the polyisocyanates so that adequate wetting takes place. In the practice of the invention, however, there is very little need for raising the temperature of the polyol solution prior to the addition of polyisocyanates because in most instances the reaction between the polyol and polyisocyanate takes place to form urethanes and the reaction between the isocyanate groups to form polyisocyanurates is sufficiently rapid at atmospheric temperature to form a dry putty-like composition in less than about three hours times. Since the polyisocyanurate resin may contain unreacted isocyanate groups, cross-linking between the urethane thickener and the resin may take place by the formation of urethane or isocyanurate linkages to a minor extent. Usually it is easily handleable and shapable by injection molding techniques.

By selection of suitable catalysts and temperatures, the polymerization of the gelled resin/monomer solution may be carried out in several sequences. For example, the polyurethane precursers may be fully reacted prior to any substantial reaction between the ethylenically unsaturated monomer and isocyanurate resin. Alternatively, the ethylenically unsaturated isocyanurate resin may be partially reacted with the ethylenically unsaturated monomer before any substantial reaction between the urethane precursers has taken place. Furthermore, conditions and catalysts may be chosen such that the isocyanate/diol reaction takes place simultaneously with the addition reaction of the ethylenically unsaturated isocyanurate resin with the ethylenically unsaturated monomer.

Reaction between the ethylenically unsaturated isocyanurate resin and the monomer is usually activated by the presence of a catalyst, for example, a peroxide like benzoyl peroxide, cyclohexanone peroxide, ditertiary butyl peroxide, dicumyl peroxide, tertiary butyl perbenzoate and 1,1-bis(t-butyl peroxy) 3,3,5-trimethylcyclohexane, to name a few. Some of these catalysts react at low temperatures to initiate free-radicals while others are activated at high temperatures in the presence of an accelerator, such as a dilute solution of cobalt soap or an amine. The selection of the free-radical catalyst is important if one is to control the time at which the addition polymerization takes place. It is contemplated that light activated free-radical catalysts may also be used if lower temperatures are preferred. In the performance of the present invention, it is preferred that the addition polymerization between the isocyanurate resin and the ethylenically unsaturated monomer takes place within the mold at temperature of the mold.

Suitable shaping methods include casting and compression molding. For example, a shaped article may be produced by charging the components of the mixture into a suitable mold in which they are first gel polymerized to form what is often referred to as a preform. The mixture may also be compressed during gel polymerization.

It has been found that the initially shaped gel or preform of the invention may also be further shaped when the components of the mixture are in a partially gelled or completely gel polymerized state which comprises first, forming a tractable shape of simple profile formed before the system becomes completely gel polymerized or before or while the ethylenically unsaturated monomer/polyisocyanurate resin polymerization begins as previously described; and causing or allowing the thus preshaped gel to retain its shape while completing the gellation and additional polymerization.

The preshaping process of the invention may be effective on any suitably shaped, partially gel polymerized form of simple profile which may, if desired, contain fibrous reinforcement. It can also be adapted to the preshaping of a partially gel polymerized article in the form of a sheet or pellets. The preshaping may be effected, for example, by causing the preform of simple profile to form to the contours of a mold, for example, by mechanical or vacuum means or by a combination thereof. The shaped article of simple profile such as a sheet, may be shaped, for example, by pressing between the cooperating parts of a mold or by draping over a vacuum molding device.

In many instances, a preshaped or preformed article may be moved from the mold after the thickening or gellation reaction has taken place and before the addition polymerization has substantially started. If the gel polymerized article does not retain its shape, the addition polymerization may be started while the article is in the preform mold to increase its rigidity and thereafter the article can be removed from the preform mold and injected quickly into another mold, thereby retaining a final shape while both reactions are going to completion. Furthermore, the original liquid monomer solution may be thickened by the resultant effect of the polyol/polyisocyanate reaction to form urethane or isocyanurate linkages and the simultaneous addition polymerization such that thickening takes place as a result of two independent and separate polymer chain formations. Reaction conditions can be established by experimental trial with catalyst, resin ingredients, fillers, internal mold release agents such as stearates, coupling agents and accelerators.

The properties of the shaped articles of the invention, such as the flexural and notched impact strength are improved by incorporating fibrous reinforcing materials either prior to or after gellation and before the addition polymerization reaction has been completed. The fibrous materials may be, for example, glass fiber, graphite fiber, asbestos fiber, or fibrous materials derived from well-known organic polymers. These fibrous materials may be in any suitable form, for example, in the form of cloth, a matte, ribbon, tapes, chopped staple filaments or as loosely woven veils. Furthermore, they may range in length from fibrids to continuous filaments. Usually glass fibers in the range of 1–5 cms. in length are used.

The amount of fibrous material to be incorporated will depend upon the desired improvement in the strength desired of the shaped article. In general, from 5 to 80% baed on the total weight of the shaped article is sufficient. Where it is desirable to affect a substantial improvement in strength properties, 60–80% by weight of reinforcing agent may be required.

In addition to the fibrous materials, other fillers, such as carbon black, clay, iron oxide, lithopone, mica, silica other silaceous materials, and titanium dioxide, calcium carbonate and colored pigments may be added at some convenient time during the intermixing and preparation of the gellation precursors.

The invention can be understood by the illustrations in the following examples in which parts are expressed as parts by weight.

EXAMPLES 1–7

Isocyanate/monomer/diol blends are prepared in an atmosphere relatively free of oxygen in conventional mix equipment equipped with an agitator. In proportions shown in Table I, polyisocyanurate resin/50% styrene solution, prepared as shown in Example A is blended with varying quantities of diol and mixed with varying amounts of stabilizer, peroxide catalyst, trimerization catalyst, polyurethane catalyst and internal mold-release agents.

EXAMPLES 8–11

The polyisocyanurate/styrene/diol blends of Examples 1–4 are blended with 1″ long chopped glass fibers and a polymethylenepolyphenyl isocyanate having 2.7 isocyanate groups per mol (commercially available from Rubicon Chemicals Inc. as Rubinate-M) and thereafter 500 grams of this mix is placed into a 25 centimeter square mold and permitted to gel at room temperature. After about 1.5 hours, the material becomes a rubbery, pliable, tack-free preform.

After five days, the preform is cut into four equal squares, stacked one above the other and then placed in the center of a 28 cm. square flat mold and pressed between two flat plates at 405 psi at 140° C. for a period of five minutes to form a 3 mm inch thick sheet. The ratio of ingreditents and properties of these fully-cured sheets are found in Table II.

EXAMPLES 12–15

Formulations shown in Table III were made into castings as follows: The listed ingredients in proportions as shown were mixed in conventional equipment and deaeriated under evacuation. The solutions were then poured into molds made from two glass plates separated by an edge gasket 3 mm thick on three sides. The plates were clamped and taped on the three sides so tht a cavity 28 cm×28 cm×3 mm was formed. After the solutions were poured into the mold, the open side was sealed with tape. The castings were permitted to stand at room temperature for 2–3 hours then placed in an oven pre-heated to 60° C. and held at this temperature for approximately 16 hours. They were then removed and placed in an oven at 90° C. for one hour and then into another oven at 150° C. for one hour. The clear castings were removed from the molds and tested according to conventional test procedures described in Table III. Demonstrations C and D are provided as a means for control and demonstration of the physical properites of unthickened and unreinforced polyisocyanurate resins. Examples 12–15 show the unexpected improvement in physical properties and relatively little change in the heat distortion temperatures of polyisocyanurate resins containing up to 14.8% thickening ingredients. Surprisingly, the heat distortion temperature is either the same or slightly depressed while the other physical properties are slightly improved.

TABLE I

Isocyanurate/Monomer/Diol Blends

| Examples No. | 1 | 2 | 3 | 4 | 5 | 6 | 7 |
|---|---|---|---|---|---|---|---|
| Polyisocyanurate resin/50% styrene of Ex. A | 92 | 93 | 94 | 92 | 92 | 92 | 92 |
| Polyoxypropylene (2) bisphenol A (mol wt: 348) | 3.8 | — | — | — | — | — | 2 |
| Polyoxypropylene (9) bisphenol A (mol wt: 750) | — | — | — | — | — | 7.94 | — |
| Poly (ethylene glycol adipate) (mol wt: 540) | — | 5.04 | — | — | — | — | — |
| Poly (diethyleneglycol adipate) (mol wt: 940) | — | — | 7.68 | — | — | — | — |
| Poly (diethyleneglycol adipate) (mol wt: 1050) | — | — | — | — | 11.4 | — | — |
| Poly (ethyleneglycol adipate) (mol wt: 882) | — | — | — | 9.62 | — | — | — |
| Toluhydroquinone (10% soln. in acetone) | .35 | .35 | .35 | .35 | .35 | .35 | .35 |
| 1,1-bis(t-butyl peroxy) 3,3,5 trimethyl-cyclohexanone (75% soln. in solvent) | 1 | 1 | 1 | 1 | 1 | 1 | 1 |
| Polyoxypropyl (3) oxyethyl ethylenediamine | 0.3 | 0.3 | 0.3 | 0.3 | 0.3 | 0.3 | 1.02 |
| Dibutyl tin dilaurate | 1 | 1 | 1 | 1 | .4 | .4 | .4 |
| Zinc stearate | 3 | 3 | 3 | 3 | 3 | 3 | 3 |

TABLE II

Isocyanurate/Styrene Molding Compositions

| | | Examples (Parts by Wt.) | | |
|---|---|---|---|---|
| | 8 | 9 | 10 | 11 |
| Polyisocyanurate/Styrene/Diol Blend of Ex. 1 | 101.45 | — | — | — |
| Polyisocyanurate/Styrene/Diol Blend of Ex. 2 | — | 103.69 | — | — |
| Polyisocyanurate/Styrene/Diol Blend of Ex. 3 | — | — | 107.33 | — |
| Polyisocyanurate/Styrene/Diol Blend of Ex. 4 | — | — | — | 107.27 |
| Polymethylenepolyphenylisocyanate (2.7-NCO/Mol) | 4.40 | 3.85 | 3.30 | 4.40 |
| Mol Ratio (-OH/-NCO) | 0.8 | 0.8 | 0.84 | 0.80 |
| % By Wt. Thickening Ingredients | 8.2 | 8.7 | 10.4 | 13.2 |
| % By Wt. Glass Fibers (1 inch) | 63.2 | 63.8 | 61.0 | 60.6 |
| Gelation time (min.) to reach 100,000 cps | 110 | 65 | 50 | 55 |
| Gelation time (hrs.) to become tack free | 4 | 3.4 | 2 | 2 |

| Physical Properties | ASTM Test Method | | | | |
|---|---|---|---|---|---|
| (3mm thick Molded Sheets) | | | | | |
| Flexural Strength (psi) | at 25° C. D790 | 57400 | 53800 | 49250 | 46600 |
| Flexural Modulus (psi) | at 25° C. D790 | 2.14 | 1.73 | 1.54 | 1.57 |
| Tensile Strength (psi) | at 25° C. D638 | 34400 | 33000 | 34350 | 29450 |

TABLE II-continued

| | | | | | | |
|---|---|---|---|---|---|---|
| Tensile Modulus (psi) | at 25° C. | D638 | 2.23 | 1.98 | 1.89 | 1.78 |
| Tensile Elongation (%) | at 25° C. | D638 | 2.05 | 2.24 | 2.35 | 2.19 |
| Barcol Hardness | at 25° C. | D2583 | 45–65 | 53–62 | 45–56 | 38–57 |
| Tensile Strength (psi) | at 150° C. | D638 | 21700 | 19500 | 17700 | 14300 |
| Tensile Modulus (psi) | at 150° C. | D638 | 1.18 | 1.20 | 1.11 | 1.05 |
| Tensile Elongation (%) | at 150° C. | D638 | 2.15 | 1.92 | 1.89 | 1.75 |
| Barcol Hardness | at 150° C. | D2583 | 20–30 | 10–19 | 0–14 | 1–11 |
| Notched Izod Impact Strength | | D256 | — | 37 | 34.5 | 37 |

TABLE III

Physical Properties of Unreinforced Resins

| | | Examples (Parts by Wt.) | | | | | |
|---|---|---|---|---|---|---|---|
| | | C | D | 12 | 13 | 14 | 15 |
| Polyisocyanurate Resin/50% Styrene of Ex. A | | 92 | | | | | |
| Isocyanurate/Monomer Blend of Ex. 1* | | | 98.45 | 98.45 | | | |
| Isocyanurate/Monomer Blend of Ex. 5* | | | | | 105.45 | | |
| Isocyanurate/Monomer Blend of Ex. 6* | | | | | | 101.99 | |
| Isocyanurate/Monomer Blend of Ex. 7* | | | | | | | 96.77 |
| Polymethylenepolyphenylisocyanate(2.7-NCO/Mol) | | 0 | 0 | 4.4 | 4.4 | 4.4 | 4.4 |
| % By Wt. Thickening Ingredients | | 0 | 0 | 8.1 | 14.8 | 11.8 | 6.5 |
| Mol Ratio (-OH/-NCO) | | — | — | 0.8 | 0.8 | 0.8 | 0.8 |
| Physical Properties | ASTM Test Method | | | | | | |
| (3mm Thick Molded Sheets) | | | | | | | |
| Flexural Strength (psi) | at 25° C. D790 | 14800 | 15100 | 21100 | 21900 | 23000 | 21700 |
| Flexural Modulus (psi) | at 25° C. D790 | 0.54 | 0.60 | 0.58 | 0.50 | 0.52 | 0.53 |
| Tensile Strength (psi) | at 25° C. D638 | 6900 | 8600 | 8100 | 11300 | 12000 | 9600 |
| Tensile Modulus (psi) | at 25° C. D638 | 0.54 | 0.54 | 0.59 | 0.54 | 0.49 | 0.54 |
| Elongation at Break | at 25° C. D638 | 1.47 | 1.80 | 1.54 | 3.21 | 3.54 | 2.24 |
| Barcol Hardness | at 25° C. D2583 | 47–48 | 46–48 | 46–48 | 39–41 | 40–44 | 44–46 |
| Charpy Impact Strength | at 25° C. D256 | 2.92 | 3.33 | 3.40 | 4.69 | 5.06 | 3.83 |
| Heat Distortion Temp. °C. | D648 | 152 | 130 | 152 | 134 | 144 | 153 |

*Containing all ingredients shown in Table I except Zinc Stearate.

What is claimed is:

1. A resin blend useful in preparing non-sticky molding compositions by the reaction therewith of polyisocyanates which comprises:
   5–95% by weight of polyethylenically unsaturated polyisocyanurate resin having a molecular weight in the range of 2,000–200,000,
   5–95% by weight of an ethylenically unsaturated monomer, and;
   1.5–30% by weight of a relatively non-polar polyol free of ethylenic unsaturation having a molecular weight in the range of 300–2,000 selected from the group consisting of polyols of polyethylene glycol, polypropylene glycol, polytetramethylene glycol, aromatic ethers which are condensation products of propylene oxide and aromatic polyols, and dihydroxy terminateed polyesters derived from glycols or polyether glycols and dicarboxylic acids.

2. A composition of claim 1 wherein said polyethylenically unsaturated polyisocyanurate resin is a condensation product of an aromatic polyisocyanate and a monohydric alcohol selected from the group consisting of hydroxypropyl methacrylate, hydroxypropyl acrylate, hydroxyethyl methacrylate, hydroxyethyl acrylate, pentaerythritol triacrylate, allyl alcohol, dibromoeopentyl glycol monoacrylate and monoacrylate or monomethacrylate esters of bisphenol A.

3. A composition of claim 2 wherein said aromatic polyisocyanate is selected from the group consisting of 2,4-toluene diisocyanate, 2,6-toluene diisocyanate, m-phenylene diisocyanate, p-phenylene diisocyanate, 4,4'-dephenyl ether diisocyanate, polymethylene polyphenyl isocyanates having 2-6 isocyanate groups per mol.

4. A composition of claim 1 wherein said ethylenically unsaturated monomer is selected from the group consisting of styrene, vinyl toluene, divinyl benzene, the methyl, ethyl, n-butyl, 2-ethyl hexyl or pentaerythritol esters of acrylic and methacrylic acid, triallyl isocyanurate vinyl acetate, diallyl fumarate, vinyl ether and acrylonitrile.

5. A composition of claim 1 wherein said ethylenically unsaturated monomer is styrene.

6. A composition of claim 1 wherein said ethylenically unsaturated polyisocyanurate is a condensation product of toluene diisocyanate and hydroxypropyl methacrylate.

7. A composition of claim 1 wherein said polyol is selected from the group consisting of polyethers of aromatic glycols which are condensation products of 1 mol of glycol and 2–15 mols propylene oxide.

8. A composition of claim 7 wherein said polyol is polyoxypropylene (2–9) bisphenol A.

9. A composition of claim 1 which comprises polyurethane and isocyanurate formation catalysts.

10. A composition of claim 9 having a mixture of a polyurethane and isocyanurate formation catalysts.

11. A composition of claim 1 further comprising a free-radical activation catalyst.

12. A composition of claim 1 further comprising an amount of polyisocyanate wherein the mol ratio of hydroxyl groups on said polyol to said isocyanate groups on said polyisocyanate ranges from 0.66–0.95.

13. A composition of claim 12 wherein said polyisocyanates are selected from 4,4'-diphenyl methane diisocyanate, 2,4- and 2,6- toluene diisocyanate and mixtures thereof, isophorone diisocyanates, 4,4'-dicyclohexylmethane diisocyanate, polymethylene polyphenyl polyisocyanates having 2-6 isocyanate groups per molecular and mixtures thereof.

14. A composition of claim 13 wherein said polyisocyanate has an average of 2.7 isocyanate groups per mol and said hydroxy/isocyanate mol ratio is 0.66-0.95.

15. A composition of claim 12 comprising a reinforcing filler.

16. A composition of claim 14 wherein said reinforcing filler is selected from the group consisting of glass fibers, graphite fibers, asbestos fibers, fibers derived from organic polymers, ranging in size from fibrids to continuous filaments.

17. A handleable tractable composition made by permitting the composition of claims 13, 14, 15 or 16 to thicken by the formation of urethanes and isocyanurates.

18. A fully-cured intractble composition made by the process of shaping a composition of claim 17 and thereafter copolymerizing said ethylenically unsaturated monomer with said polyisocyanurate resin by free-radical activation.

19. A resin blend of claim 1 comprising 40-50% by weight of vinyl isocyanurate resin derived from a condensation product of about 2.7 parts by weight hydroxypropyl methacrylate with 3.1 parts by weight toluene diisocyanate, 40-60% by weight styrene, minor amounts of a stabilizer selected from the group consisting of hydroquinone, parabenzoquinone, toluhydroquinone, phenothiazine, 2.5-5% by weight polyoxypropylene (2.2) bisphenol A and catalytic amounts of catalysts selected from the groups consisting of triethylamine, polyoxypropylene (3) polyoxyethylene (1) ethylene diamine and dibutyl tin dilaurate.

20. A composition of claim 19 having incorporated therewith 0.03-0.045 parts of polymethylene polyphenyl isocyanate having an average of 2.7 NCO groups per mol per part of said resin blend.

21. A composition of claim 19 comprising 50-80% by weight glass fiber reinforcing filler.

22. A composition of claim 19 comprising a free-radical activation catalyst.

* * * * *

UNITED STATES PATENT AND TRADEMARK OFFICE
CERTIFICATE OF CORRECTION

PATENT NO. : 4,232,133
DATED : November 4, 1980
INVENTOR(S) : L. James Ferrarini, Jr. and Joseph Feltzin It is certified that error appears in the above-identified patent and that said Letters Patent are hereby corrected as shown below:

Column 17, Claim 17, line 2, after the word "claims" insert
--12, --.

Signed and Sealed this

Seventeenth Day of March 1981

[SEAL]

Attest:

RENE D. TEGTMEYER

Attesting Officer

Acting Commissioner of Patents and Trademarks